July 23, 1935.     J. A. LEONARD     2,009,234
SLUICEWAY REGULATOR
Filed July 28, 1934
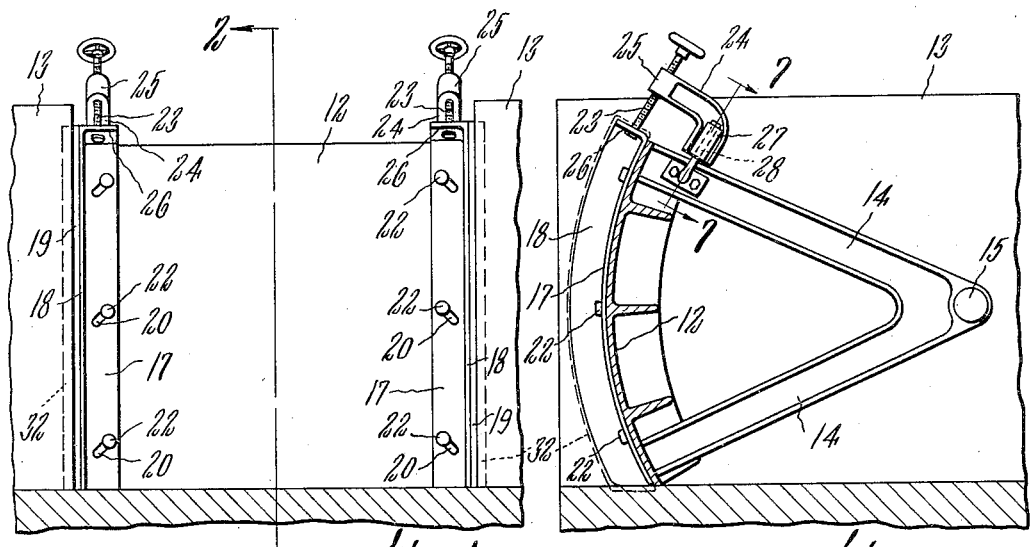

Patented July 23, 1935

2,009,234

UNITED STATES PATENT OFFICE 2,009,234

SLUICEWAY REGULATOR

James A. Leonard, Bangor, Maine

Application July 28, 1934, Serial No. 737,398

7 Claims. (Cl. 61—25)

This invention relates to a so-called Tainter gate used at dams and power houses to control the flow of water through a sluiceway.

The gate is curved and has a convex upstream side. The thrust of the water is carried by arms converging from the downstream side to large pivots supported by the sluiceway walls. The curved ends of the gate must be spaced two inches or more from the sluiceway walls to compensate for irregularities in the walls. The leakage through these spaces or gaps is usually checked by devices such as packing strips of flat rubber belting, or specially formed rubber tubes attached to the gate ends, but the belting is liable to be displaced by water pressure, and the rubber tubes are usually short lived.

The chief object of my invention is to provide simple and durable means for closing the spaces or gaps between the gate ends and the sluiceway walls when the gate is closed, said means being adjustable to prevent resistance to the opening movement of the gate.

Other objects will hereinafter appear.

Of the accompanying drawing forming a part of this specification,—

Figure 1 is a front view looking toward the upstream side of a Tainter gate and the ends of the sluiceway walls between which the gate is located.

Figure 2 is a section on line 2—2 of Figure 1.

Figures 3 and 4 are fragmental front views, one showing an open space between an end of the gate and a sluiceway wall, and the other showing said space closed.

Figure 5 is a section on line 5—5 of Figure 3.

Figure 6 is a section on line 6—6 of Figure 4.

Figure 7 is a section on line 7—7 of Figure 2.

Figures 8 and 9 are enlarged sections similar to Figures 5 and 6 showing means for pressing the slide against the gate.

Figure 10 is a fragmental perspective view showing a portion of the gate and the gap closing member hereinafter described.

The same reference characters indicate the same parts in all of the figures.

In the drawing,—12 designates a curved gate movable in a curved path between sluiceway walls 13, the gate having a convex side facing upstream.

Fixed to the gate and projecting from the downstream side thereof are arms 14 which converge from the gate and are joined at their outer ends, the joined ends of each pair of arms being mounted to swing in a vertical plane on a pivot 15 supported by a wall 13.

As indicated by Figures 3 and 5 the curved ends of the gate are separated from the walls 13 by spaces or gaps 16 which are required to compensate for irregularities in the masonry of the walls.

I provide means characterized as next described for closing said gaps and thereby preventing, or greatly minimizing, leakage between the walls and the ends of the gate, there being duplicate means at the opposite ends of the gate. A description of one of said means will suffice for both.

17 designates a curved metal slide conforming to the curvature of the gate, and movable thereon. Fixed to the slide is a flange which, in the embodiment of the invention here shown, is composed of a metal portion 18 fixed to one edge of the slide, and having an outer side face maintained by the slide in a position substantially parallel with a wall 13, and a packing strip 19 of compressible material, such as rubber belting, bearing on the outer side of the metal portion 18 and attached thereto by any suitable means as cement, or countersunk soft metal rivets. The slide and the flange portion 18 constitute a curved body element which is angular in cross section, the packing strips constituting a compressible facing which, as hereinafter stated, is compressible by the flange portion 18 against a wall 13.

In case the wall 13 is sufficiently smooth, the packing strip, or compressible facing 19 may be omitted, leakage being prevented or sufficiently minimized by direct contact of the metal flange or flange portion 18 with the wall.

I provide means, preferably embodied in the jack hereinafter described, for moving the slide 17 endwise in opposite directions, and means for movably confining the slide on the gate and adapted to move the slide edgewise on the gate to impart sidewise and endwise movements to the flange and cause the closing of the gap 16. The last mentioned means, in the embodiment of the invention here shown, is embodied in diagonal slots 20 in the slide 17, and studs 21 of non-rusting metal fixed to the gate and provided with heads 22 bearing on one side of the slide to confine the latter against the gate. The jack which moves the slide endwise includes a screw 23 which is operable to impart endwise movements to the slide and hold the latter either in the position shown by Figures 3 and 5, or that shown by Figures 4 and 6. The arrangement of the slots 20 and studs 21 is such that they coöperate in imparting edgewise movements to the slide 17, and sidewise movements to the flange, thereby causing the gap-closing member to close a gap 16 when the flange is moved toward the wall.

The jack may be of any desired construction and may be operated either by hydraulic means, or manually. I have here shown a simple form of manually operated jack which includes an arm 24 pivotally mounted on one of the gate-supporting arms 14 and provided with a nut portion 25 with which the screw 23 is engaged. The jack screw 23 is swivelled to an ear 26 on one end of the slide 17, so that an endwise movement of the screw imparts an endwise movement to the slide. The jack arm 24 is provided with a socket 27 adapted to turn on a pin 28 fixed to the gate supporting arm 14. The screw 23 is therefore adapted to move laterally to a sufficient extent to compensate for an edgewise movement of the slide 17 and a sidewise movement of the flange 18. When the flange is moved away from the wall an unobstructed opening of the gate is permitted.

To permit the thawing of ice which may obstruct the described movements of the gap closing member, I provide a curved metal conduit 30 which is welded or otherwise fixed to the angular body formed by the slide and flange, and, as here shown, is fixed to the flange or flange portion 18. Said conduit extends from end to end of said body and may receive live steam through a flexible conduit 31, or an electrical heating unit.

To further oppose leakage between the sluiceway walls and the gate ends, I preferably provide each wall with a seating plate 32 of rustless metal fixed by any suitable means to the wall, and having a smooth outer surface substantially flush with the wall surface. The plate 32 is curved to conform to the curvature of the flange, and is arranged to constitute a flat seat for the flange when the latter is forced outward, a practically watertight joint being thus formed.

To cause close contact between the slide 17 and the side of the gate on which it bears when the slide and the flange are forced outward to prevent or minimize leakage, I provide wedge-shaped metal plates 34 associated with the gate studs 21, and welded or otherwise fixed to the slide 17, said plates having slots 35 receiving said studs, and permitting the plates to move thereon with the slides, and washers 36, preferably wedge-shaped, interposed between the stud heads 22 and the plates 34, and constituting, in effect, enlargements of the stud heads 22.

The arrangement is such that when the flange is separated from the sluiceway wall 13, the wedge-shaped plate 34 is in the position shown by Figure 8 and the slide 17 is somewhat loose on the gate 12. When the gap-closing member flange contacts with the wall 13, the wedge-shaped plate 34 is in the position shown by Figure 9, and the slide is pressed closely against the gate and forms therewith a practically watertight joint preventing leakage between the slide and the gate.

It will be understood that a wedge-shaped plate 34 may be associated with each gate stud 21, although to simplify the drawing, I have shown said plate only in Figures 8 and 9. For additional simplification I have shown the conduit 30 only in Figures 5, 6 and 10.

I claim:

1. A sluiceway regulator which includes a curved gate having a convex upstream side and movable in a curved path between sluiceway walls, means supporting the gate against pressure on its upstream side; and means for closing a gap between a sluiceway wall and an end of the gate, said means comprising a gap-closing member including a curved slide conforming to the curvature of the gate and movable thereon, and a curved flange fixed to the slide and having a side face maintained by the slide in a position substantially parallel with a sluiceway wall, means connected with the gate for moving the slide endwise in opposite directions, and means for movably confining the slide on the gate and causing edgewise movements of the slide when it is moved endwise, and thereby moving said flange sidewise toward and from said wall and causing contact of the flange with the wall when said flange is moved in one direction, and permitting an unobstructed opening of the gate when the flange is moved in the opposite direction.

2. A sluiceway regulator which includes a curved gate having a convex upstream side and movable in a curved path between sluiceway walls, means supporting the gate against pressure on its upstream side; and means for closing a gap between a sluiceway wall and an end of the gate, said means comprising a gap-closing member including a curved slide conforming to the curvature of the gate, and movable thereon, and a curved flange fixed to the slide and having an outer side face maintained by the slide in a position substantially parallel with a sluiceway wall, means connected with the gate for moving the slide endwise in opposite directions, said slide having diagonal slots, studs fixed to the gate and projecting into said slots, said slots and studs movably confining the slide on the gate and causing edgewise movements of the slide when it is moved endwise, and thereby moving the flange sidewise toward and from said wall and causing contact of the flange with the wall when said flange is moved in one direction, and separating the flange from the wall to permit an unobstructed opening of the gate when the flange is moved in the opposite direction.

3. A sluiceway regulator which includes a curved gate having a convex side and movable in a curved path between sluiceway walls, means supporting the gate against pressure on its upstream side; and means for closing a gap between a sluiceway wall and an end of the gate, said means comprising a gap-closing member including a curved slide conforming to the curvature of the gate and movable thereon, and a curved flange fixed to the slide and having a side face maintained by the slide in a position substantially parallel with a sluiceway wall, a jack including an arm mounted on the gate-supporting means and a screw engaged with a nut on said arm and connected with the slide, said screw being operable to impart endwise movements to the slide in opposite directions, and means for movably confining the slide on the gate and causing edgewise movements of the slide when it is moved endwise and thereby moving said flange sidewise toward and from said wall, and causing contact of the flange with the wall when the flange is moved in one direction, and permitting an unobstructed opening of the gate when the flange is moved in the opposite direction.

4. A sluiceway regulator as specified by claim 3, said jack arm being pivotally mounted on a supporting member of the gate and having the nut, and a screw engaged with the nut and swivelled to the slide, the jack being adapted to impart endwise movements to the slide, the pivotal mounting of said arm permitting lateral movements of the screw compensating for the movements of the slide and the pressing member.

5. A sluiceway regulator as specified by claim 1, comprising also a curved metal conduit fixed to and contacting with the gap-closing member, and means for conducting a heating medium thereto.

6. A sluiceway regulator as specified by claim 1, comprising also means for pressing the slide against the gate when the slide is moved edgewise to cause contact of the flange with the wall, said means comprising wedge-shaped plates fixed to the slide and associated with the gate studs, said plates having slots receiving said studs and permitting movements of the wedge-shaped plates with the slide, and washers interposed between the stud heads and the plates.

7. A sluiceway regulator as specified by claim 1, said flange including a metal portion fixed to the slide and having an outer side face maintained by the slide substantially parallel with a sluiceway wall, and a compressible packing strip fixed to the metal portion and constituting the outer side face of the flange, said strip being compressed against the wall when the flange is moved in one direction.

JAMES A. LEONARD.